(12) United States Patent
Stötzer et al.

(10) Patent No.: US 6,715,974 B2
(45) Date of Patent: Apr. 6, 2004

(54) CONNECTION MEANS FOR STRAPPING OR TRANSPORT BELTS

(75) Inventors: Jürgen Stötzer, Dreieich (DE); Richard Haus, Kostheim (DE)

(73) Assignee: Werkstätten fur Behinderte Rhein-Main E.V., Rüsselsheim (DE)

( * ) Notice: Subject to any disclaimer, the term of this patent is extended or adjusted under 35 U.S.C. 154(b) by 0 days.

(21) Appl. No.: 10/243,563

(22) Filed: Sep. 13, 2002

(65) Prior Publication Data

US 2003/0077140 A1 Apr. 24, 2003

Related U.S. Application Data

(63) Continuation of application No. PCT/EP00/02297, filed on Mar. 15, 2000.

(51) Int. Cl.⁷ .................................................. B60P 7/08
(52) U.S. Cl. ........................ 410/105; 410/102; 410/104
(58) Field of Search .................... 410/101, 102, 410/104, 105, 106, 116; 24/265 CD, 68 CD, 302, 115 K; 248/499

(56) References Cited

U.S. PATENT DOCUMENTS

| 2,743,684 | A | * | 5/1956 | Elsner ........................ 410/105 |
|---|---|---|---|---|
| 3,189,313 | A | | 6/1965 | Burns et al. |
| 3,605,637 | A | * | 9/1971 | Prete, Jr. ..................... 410/105 |
| 4,230,432 | A | * | 10/1980 | Howell ........................ 410/102 |
| 4,256,424 | A | * | 3/1981 | Knox et al. .................. 410/105 |
| 4,496,271 | A | * | 1/1985 | Spinosa et al. ............. 410/105 |
| 4,509,888 | A | * | 4/1985 | Sheek ........................ 410/105 |
| 4,708,549 | A | * | 11/1987 | Jensen ........................ 410/105 |
| 4,850,769 | A | * | 7/1989 | Matthews ..................... 410/105 |
| 4,932,816 | A | * | 6/1990 | Ligensa ....................... 410/105 |
| 5,609,452 | A | * | 3/1997 | Looker et al. ............... 410/105 |
| 5,625,926 | A | | 5/1997 | Berrezouga |
| 5,765,978 | A | * | 6/1998 | Looker et al. ............... 410/105 |
| 5,871,318 | A | * | 2/1999 | Dixon et al. ................. 410/105 |
| 6,394,720 | B1 | * | 5/2002 | McCay ........................ 410/100 |

FOREIGN PATENT DOCUMENTS

EP    0 639 126 B1    6/1997
GB       787750       12/1957

* cited by examiner

*Primary Examiner*—Stephen T. Gordon
(74) *Attorney, Agent, or Firm*—Quarles & Brady LLP

(57) ABSTRACT

The invention refers to a connection for strapping or transport belts including a lock body and an engagement element. The lock body has a plurality of integrally connected lock elements and a guide for the strapping or transport belt(s).

6 Claims, 3 Drawing Sheets

CONNECTION MEANS FOR STRAPPING OR TRANSPORT BELTS

Figure 1:
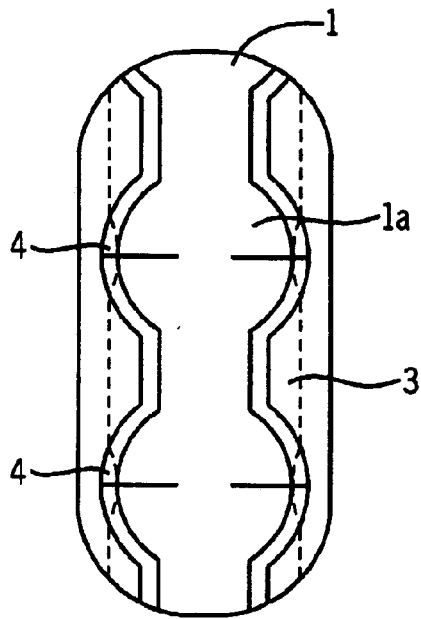

This application is a continuation of international application number PCT/EP00/02297, filed Mar. 15, 2000.

The present invention refers to a connection means for strapping or transport belts having a lock member and an engagement member.

Strapping or transport belts are particularly used in the field of air freight transports to fix/secure the transport belt. These strapping or transport belts have engagement elements with mushroom-shaped engagement dies, which are inserted and locked into corresponding lock profiles or profile rails secured to the aircraft, said profiles or rails being provided on freight pallets for receiving the corresponding engagement dies.

This (standardized) air freight equipment for reliably fixing air freight can for instance be derived from the international standard ISO 9788, wherein the technical minimum requirements of such fitting elements are defined in further standards, e.g. in ISO/DIN 7166. Corresponding connection fittings are for instance known from GB 787 750, U.S. Pat. No. 3,605,637, U.S. Pat. No. 2,743,684 or by using the lock member as a further belt-relating part (for extending belts) from EP 0 639 126 B1.

The object of the invention is to further improve a connection means of the above-mentioned kind regarding its multi-valent usability and in particular to provide the possibility of the creation of network-like belt systems.

This object is solved according to the invention in a connection means of the above-mentioned type in that the lock body comprises a plurality of integral one-piece lock elements and forms a guide rail for at least one strapping or transport belt.

The lock elements are preferably plate-shaped and formed with a one-sided engagement structure for at least one engagement element and are connected to one another in an integral one-piece manner in an opposite "back-to-back" fashion by leaving a guide gap so that at least one belt guide is formed between the lock elements.

Such a lock element arrangement can either loosely or fixed in a loop be received on a strapping or transport belt and may in this manner form a point of engagement for a multitude of engagement elements so that a network-like structure of connection belts for strapping the transport belt is possible in connection with stationary profile rails on transport pallets or in an arrangement fixed in the aircraft and also with respect to the strapping or transport belts amongst each other.

A positive detection means, in particular according to the groove and tongue principle, is provided preferably between the lock and the engagement element, which leads to the fact that only authorized elements can be used as fitting elements of the connection means, since an additional positive locking between the lock and the engagement element is necessary or takes place next to the locking engagement.

The engagement element preferably comprises at least one mushroom-shaped engagement die and the lock element comprises at least one T-groove-shaped lock profile, having an engagement opening preferably substantially circular for receiving the mushroom-shaped engagement die.

Additionally, a pre-loaded safety cylinder is preferably provided, which holds the engagement element in a captive locking engagement with the lock element after inserting same, wherein the positive detection means is preferably formed at this safety cylinder in connection with a counter-form element at the engagement opening of the lock element.

Of course, a plurality of mushroom-shaped engagement dies may be provided in a series arrangement on the engagement element with a corresponding profile design of the lock element in a conventional manner next to the conventional double-arrangement of engagement openings for a mushroom-like engagement die and engagement openings for the safety cylinder (having a similar or identical shape).

A guide means (preferably a guide slot) extends between the double-profile of the double-lock member in a width that basically corresponds to the length of the entire lock element so that the belt of the strapping or transport belt can easily be guided or the double lock member can be received on the transport or strapping belt either freely movable across its length or in a looped manner captively fixed on the belt.

The invention will now be explained by means of embodiments and associated drawings.

Figure 2:
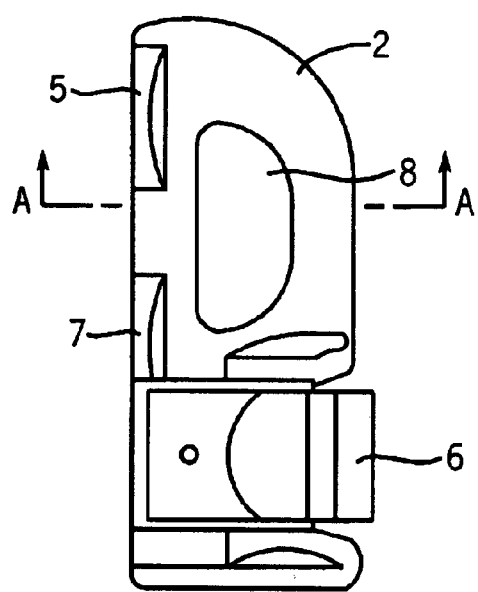
Figure 3:
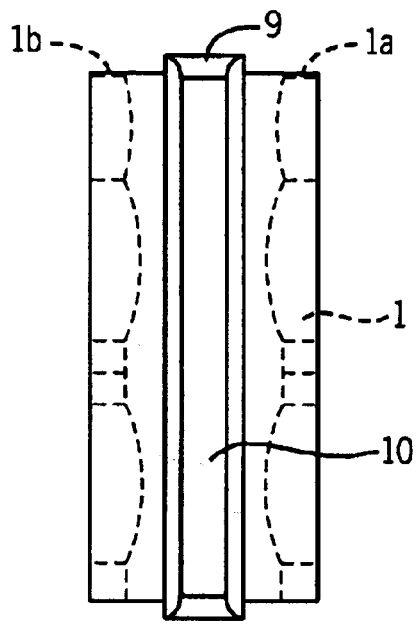
Figure 2A:
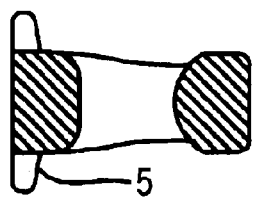
Figure 4:
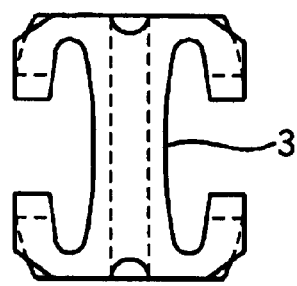
Figure 5:
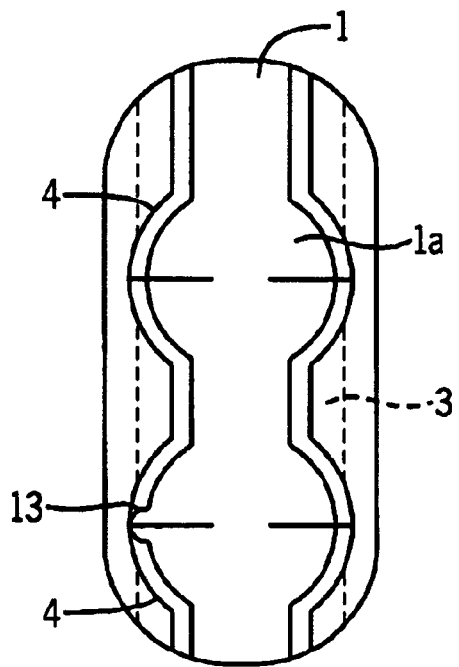
Figure 6:
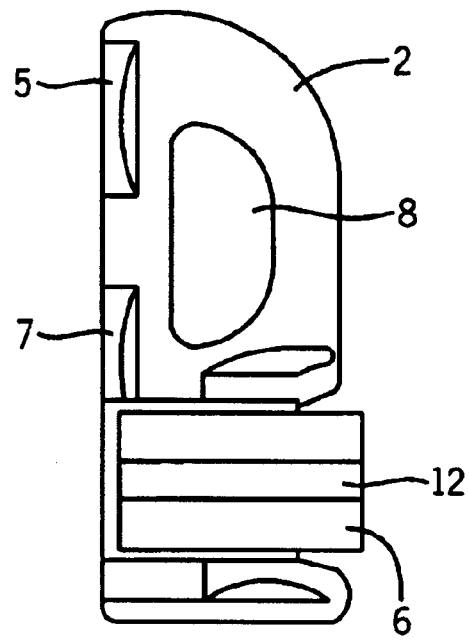
Figure 7:
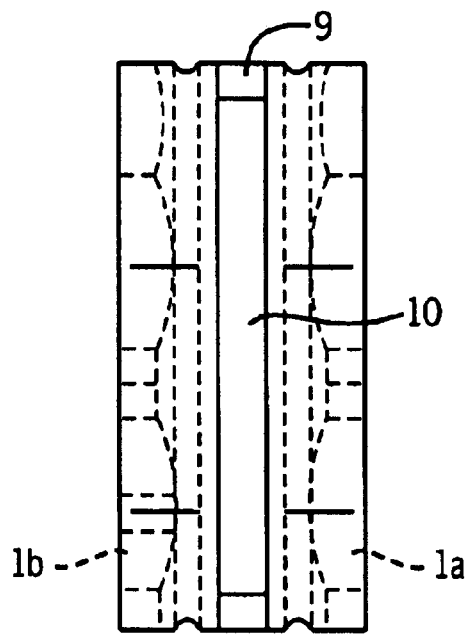
Figure 8:
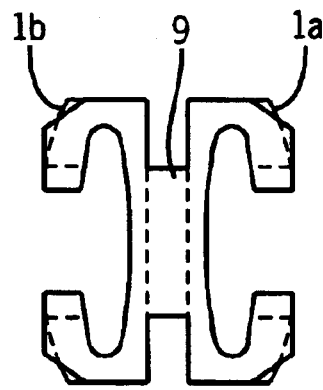
Figure 9:
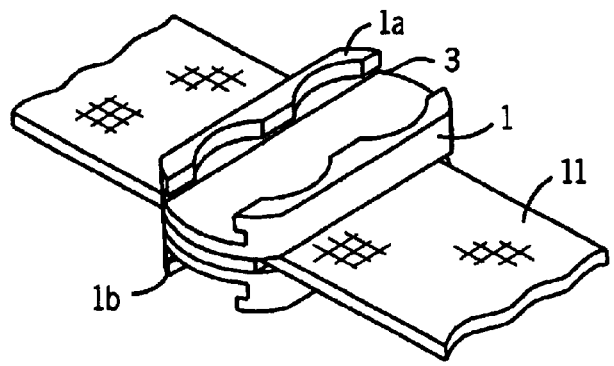
Figure 10:
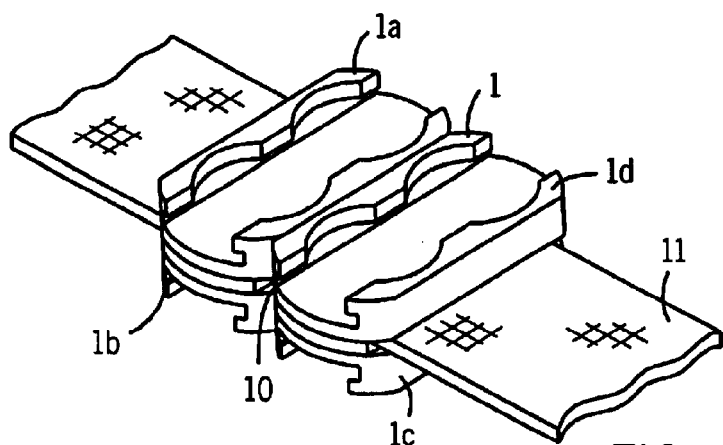
Figure 11:
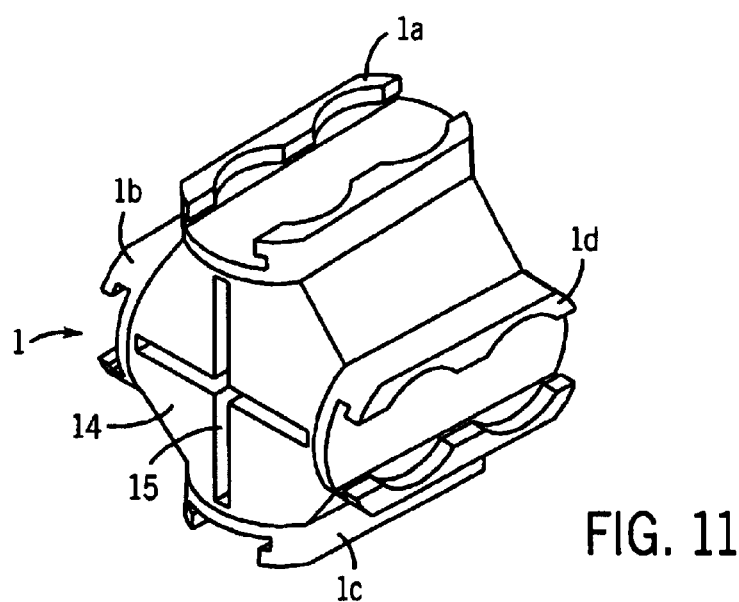

FIG. 1 is a top view onto a lock body of the connection means with a lock element according to a first embodiment, FIG. 2 is a side view of an engagement member of the connection means that can be received in the lock element according to FIG. 1, FIG. 2a is a sectional view according to section A—A in FIG. 2, FIG. 3 is a side view of the lock element according to FIG. 1, FIG. 4 is a side view of the lock body according to FIG. 1, FIG. 5 is a top view of a lock body of the connection means with a lock element according to a second embodiment, FIG. 6 is a side view of an engagement element of the connection means that can be received in the lock element according to FIG. 5 in a partial schematic view, FIG. 7 is a side view of the lock body according to FIG. 5, FIG. 8 is a front view of the lock body according to FIG. 5, FIG. 9 is a perspective view of a lock body according to FIG. 5 received on a transport belt, FIG. 10 is a view similar to that of FIG. 9, wherein the lock body is formed in a parallel double arrangement with four integral lock elements, and FIG. 11 is an embodiment for forming a node element as a lock member, provided with four lock elements according to FIG. 5

A connection means according to a first embodiment is shown with its two main components lock body 1 with lock element 1a and engagement element 2 in the first embodiment according to FIGS. 1 to 4. The basic engagement structure of the lock member 1, consisting of a T-groove 3 (see also front view according to FIG. 4) having substantially circular engagement openings 4 into which a mushroom 5 of the engagement element 2 can be inserted, and wherein on the other hand the engagement element 2 is longitudinally shiftable in the T-groove (for engagement of a safety cylinder 6 into one of the engagement openings 4), is conventional and known from the prior art.

The safety cylinder 6, which is resiliently and vertically supported (FIG. 2 in the drawing plane) on the engagement element 2 engages—after inserting the mushroom-shaped engagement projection 5 into the one engagement opening 4 of the lock element 1a and after subsequent longitudinal displacement of the engagement element—into the T-groove 3 of the lock element 1a (after previous insert-engagement of a half-mushroom element 7 at the engagement element 2 in the further engagement opening 4 of the lock element 1a) and locks the engagement element 2 at the lock body (lock element 1*a*) as it's common (cf. ISO 9788, double-stud-fitting). A belt, that is not shown, is guided in an eye 8 of the engagement element 2, said belt being defined via the engagement element 2 effective as belt anchor on the lock body 1.

In its basic design, the lock member 1*a* may either be part of a stationary rail arrangement in the aircraft or of transport pallets for the freight or it may—as provided in this case—be guided as a single element on a transport belt 11 (FIG. 9).

In the embodiment according to the invention, the lock body 1 is formed by two lock elements 1*a* and 1*b*, each having the conventional engagement structure with the T-groove 3 and the engagement openings 4 and which are integrally connected to one another on their back sides via a web means 9 to form a unit (preferably as a break-proof cast member) so that a guide gap 10 remains between the lock elements 1*a* and 1*b*, which form the lock body 1, through which said guide gap a transport belt 11 8*cf*. FIG. 5) being able to be passed. The width of this guide gap 10 preferably corresponds substantially to the length of the lock element 1*a*, 1*b* of the lock body 1 and at least to the width of the transport belt 11 (see FIG. 5) so that this element can smoothly and with no constrictions be received in the lock body 1 that is either freely guided on the transport belt 11 or that is fixed in a loop that is stationarily fixed at this transport belt.

Thereby, it is possible to engage the lock body 1 from both different sides with engagement elements 2 (that form belt anchors) in a conventional way and to thereby establish network-like belt systems.

The connection of the lock elements 1, 1*b* by forming a belt guiding means 10 can either be made in a different manner, as shown in a comparison of FIGS. 3 and 5 or 7, respectively In the second embodiment according to FIG. 5 seq., the lock elements 1*a*, 1*b* are connected via a web 9 that does not protrude to the outside to form an integral body. Moreover, at least one engagement opening 4 of the lock body comprises a vertical groove 13 into which a form projection 12 (rib) of the safety cylinder 6 may latchingly engage, which ensures that only authorized engagement elements 2 can be connected to the lock bodies 1 and that unauthorized lock elements or lock body and engagement elements 2 do not fit to the respective counter piece.

In the second embodiment, the web connection of the two lock elements is formed smaller regarding the profile height, as shown in FIG. 8.

Regarding the safety cylinder, FIG. 6 is practically identical to the standardized engagement element 2 according to the first embodiment, except for the form rib 12 on the safety cylinders 6 as a detection or element individualization means. Moreover, the safety cylinder 6 is only shown schematically in FIG. 6.

FIG. 9 shows the accommodation of a lock body 1 with the lock elements 1*a* and 1*b* according to the second embodiment (FIG. 5) on the transport belt 11 In the same manner, a lock body 1 according to the first embodiment according to FIG. 3 can be accommodated on the transport belt 11 by passing the transport belt 11 through the guide slot 10.

FIG. 6 shows an embodiment in which the one-piece lock body 1 consists of four lock elements 1*a*, 1*b*, 1*c* and 1*d*, each being arranged parallel in pairs, so that the connection variability for engaging engagement elements 2 is further increased.

FIG. 11 shows only as an example a lock body 1, formed as a cube, in which lock elements 1*a* to 1*d* are formed in a manner distributed around the outer circumference (these engagement profiles may e.g. also be cast or worked integral into the outer surface of the cubic or parllelpiped-shaped base body 14). The base body 14 has cross-wise guide slots 15 for passing a strapping or transport belt depending on the position orientation of the lock body 1. Such "nodes" are advantageous for forming spatial transport belt networks, since they enable the engagement of engagement elements 2 or belt anchors from other directions. The lock elements 1*a* to 1*d* may be arranged at such a lock body 1 in a spatial formation also in different orientation, i.e. with their longitudinal axes inclined to each other or at right angle to each other.

The invention enables an integration of the belt guidance in a plurality of lock elements, which substantially increases the variability of the provision of attachment belt networks for solving air freight problems.

What is claimed is:

1. A connection means for strapping or transport belts, comprising a lock body and an engagement element, wherein the lock body forms a plurality of integrally connected lock elements and a guide means for at least one strapping or transport belt, wherein the lock elements are formed in a plate-like manner with a one-sided engagement structure for at least one engagement element and wherein the guide means is formed between the lock elements.

2. A connection means as claimed in claim 1, wherein a pine-loaded safety cylinder is included as a positive engagement safety means for a captive engagement between the engagement element and the lock body of the connection means.

3. A connection means as claimed in claim 1, wherein a plurality of lock elements is arranged in parallel and connected to each other in opposing manner, and at least one belt guide wherein the guide means is formed between said opposing lock elements.

4. A connection means as claimed in claim 1, wherein the lock body and the engagement elements element comprise a positive detection means.

5. A connection means as claimed in claim 4, wherein the detection means is a positive engagement means between the lock body and the engagement element.

6. A connection means as claimed in claim 1, wherein the engagement element has at least one mushroom-like engagement die and the lock elements has a T-groove-shaped lock profile, comprising at least one engagement opening for accommodating one of the engagement die and or a safety cylinder.

* * * * *

UNITED STATES PATENT AND TRADEMARK OFFICE
CERTIFICATE OF CORRECTION

PATENT NO. : 6,715,974 B2
DATED : April 6, 2004
INVENTOR(S) : Jurgen Stotzer et al.

It is certified that error appears in the above-identified patent and that said Letters Patent is hereby corrected as shown below:

<u>Column 4,</u>
Line 45, "engagement elements element" should be -- engagement element --.
Line 52, "and the" should be -- and wherein at least one of the --.

Signed and Sealed this

Tenth Day of August, 2004

JON W. DUDAS
*Acting Director of the United States Patent and Trademark Office*